United States Patent [19]

Howering

[11] Patent Number: 4,576,535
[45] Date of Patent: Mar. 18, 1986

[54] NONRESILIENTLY DEFORMABLE FASTENER

[75] Inventor: Robert Howering, Montville, N.J.

[73] Assignee: Eaton Corporation, Cleveland, Ohio

[21] Appl. No.: 552,534

[22] Filed: Nov. 16, 1983

[51] Int. Cl.⁴ ............................................ F16B 19/08
[52] U.S. Cl. ................................ 411/503; 411/520; 411/522; 24/453; 24/703
[58] Field of Search ...................... 411/15, 21, 22, 359, 411/360, 500–503, 508–510, 516, 520, 522, 477, 478; 24/453, 616, 625, 703

[56] References Cited

U.S. PATENT DOCUMENTS

| | | | |
|---|---|---|---|
| 2,129,949 | 9/1938 | Lombard | 24/453 |
| 2,137,210 | 11/1938 | Lombard | 24/453 |
| 2,548,838 | 4/1951 | Gillespie | 24/625 |
| 2,620,537 | 12/1952 | Gogin-Daude | 411/503 |
| 2,732,749 | 1/1956 | Pasternak | 411/520 |
| 2,748,645 | 6/1956 | Peckham et al. | 24/703 |
| 3,347,127 | 10/1967 | Brown | 411/520 |
| 4,142,810 | 3/1979 | Lesaint | 24/625 |

*Primary Examiner*—Kenneth J. Dorner
*Assistant Examiner*—Neill Wilson
*Attorney, Agent, or Firm*—C. H. Grace; H. D. Gordon

[57] ABSTRACT

A one-piece sheet metal fastener (10) for joining two or more panels (14, 16) having a combined axial thickness (18) within a given range and aligned apertures (22, 24) of a given diameter (24) is provided. The fastener comprises two sidewall portions (28, 30) joined by a bight portion (32) which are aligned in the initial configuration of the fastener and which may be nonresiliently deformed by relative transverse movement of tab portions (46, 48) extending downwardly from transverse opposite sides of each sidewall portion.

4 Claims, 5 Drawing Figures

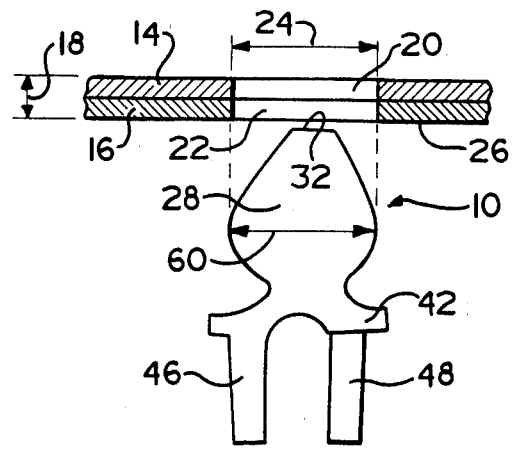
FIG. 2
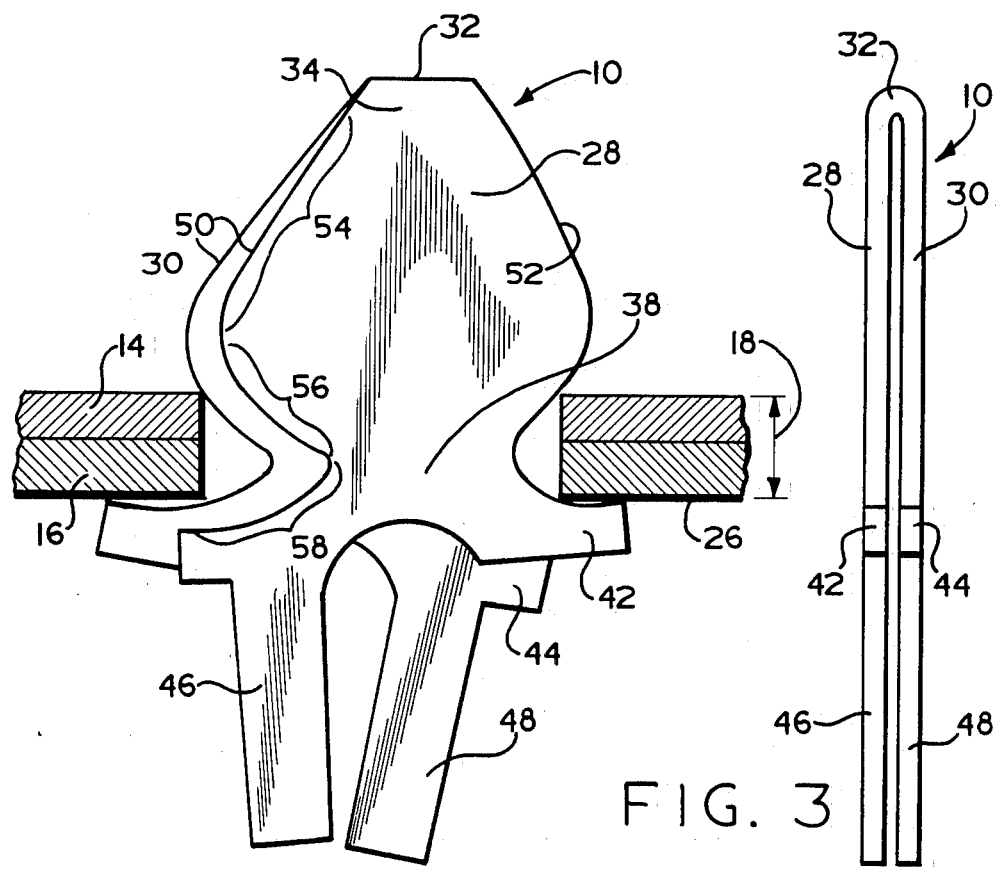
FIG. 1
FIG. 3

NONRESILIENTLY DEFORMABLE FASTENER

BACKGROUND OF THE INVENTION

1. Field of the Invention

The present invention relates to a sheet metal fastener for joining a plurality of apertured panels and more particularly to a one-piece nonresiliently deformable sheet metal fastener of the dart type for joining a plurality of panels having a combined thickness within a given range.

2. Description of the Prior Art

Resilient fasteners of the dart type, usually of spring steel or resiliently deformable plastic, for joining two or more apertured panels or the like are well known in the prior art. Examples of such prior art fasteners may be seen by reference to U.S. Pat. Nos. 3,916,755; 3,959,852 and 3,412,437, the disclosures of all of which are hereby incorporated by reference.

Nonresiliently deformable, or malleable, fasteners or fastener assemblies for joining two or more apertured panels or the like are also well known in the prior art as may be seen by reference to U.S. Pat. Nos. 3,417,438; 3,108,666 and 2,732,749, the disclosures of all of which are hereby incorporated by reference.

While the prior art fasteners or fastener assemblies were generally acceptable for many purposes, they were not totally satisfactory. The resiliently deformable type required a resiliently deformable material and/or construction which was often somewhat complicated and/or expensive, were often only effective within a relatively small combined panel thickness range and/or required an insertion force which was often excessive. The nonresiliently deformable fasteners or fastener assemblies of the prior art were often of a complicated and/or expensive construction and/or required specialized assembly tooling.

SUMMARY OF THE INVENTION

In accordance with the present invention, a relatively simple, inexpensive, one-piece sheet metal nonresiliently deformable fastener of the dart type for joining two or more panels or members having a combined thickness within a relatively large range and aligned apertures of a given diameter is provided.

The above is accomplished by providing a one-piece sheet metal fastener comprising two generally flat wall portions, each of a generally dart configuration, joined at the nose or tip sections thereof and folded upon themselves to define a bight portion therebetween. In the insertion configuration of the present invention, the wall portions are aligned (i.e. superimposed) and in close side-by-side relationship. Each wall portion includes a tab section extending away from the tip section. The tab section of one wall portion extends from the opposite transverse side thereof as the tab section of the other wall portion. The tab sections may be forced or squeezed together to nonresiliently deform the bight portion with the side portions transversely offset to nonresiliently deform the fastener of the present invention into the fastening configuration thereof.

Each of the side wall portions defines at least one generally axially extending edge on the transverse side thereof opposite the transverse side from which the tab portion extends which edges in combined projection define the dart type configuration of the present invention in the initial or insertion configuration thereof. Preferably, each of the side wall portions will define two axially extending edges which are preferably mirror images, or substantially mirror images, about an axially extending line transversely centered in each sidewall portion. The edges extend downwardly from the tip portion to a base portion and include a first segment extending transversely outwardly and downwardly from the tip portion, a second segment extending transversely inwardly and downwardly from the first segment and a third segment extending transversely outwardly and downwardly from the second segment. In the initial nondeformed configuration of the fastener, the transverse separation of the junctions of the first and second segments of the two wall portions will be equal to or slightly less than the diameter of the aperture provided in the panels to be joined. At least a small length of the third segments of the edges are transversely separated by a distance greater than the diameter of the apertures in the panels to define the base portion of the fastener. The tab portions extend axially downwardly from the base portions. The maximum combined thickness of panels joinable by the fastener of the present invention is defined by the axial separation of the junction of the first and second segments of the edges from the point on the third segments of the edges transversely separated by a distance equal to the diameter of the panel apertures.

In operation, the fastener of the present invention is inserted through the aligned apertures of the panels to be joined and then the tab portions are squeezed or forced transversely together to deform the bight portion in a nonresilient manner and offset the sidewall portions causing the walls of the apertures to be tightly engaged by the second and third segments of the edges of the sidewall portions at generally diametrically opposed points.

Accordingly, it is an object of the present invention to provide a new and improved one-piece sheet metal fastener for joining a plurality of panels having a combined thickness within a given range and provided with aligned apertures of a given diameter.

Another object of the present invention is to provide a new and improved relatively simple, relatively inexpensive fastener for joining two or more panels having a combined thickness within a given range and aligned apertures of a given diameter which fastener requires little or no insertion force and nonspecialized tooling to assembly same to the panels.

These and other objects and advantages of the present invention will become apparent from a reading of the following description of the preferred embodiment taken in connection with the attached drawings.

BRIEF DESCRIPTION OF THE DRAWINGS

FIG. 1 is a plan view, partially in section, of the fastener of the present invention in the nonresiliently deformed fastening configuration thereof.

FIG. 2 is a plan view, partially in section, of the fastener of the present invention in the nondeformed initial or insertion configuration thereof.

FIG. 3 is a side view of the fastener illustrated in FIG. 2 in the nondeformed initial insertion configuration thereof.

DESCRIPTION OF THE PREFERRED EMBODIMENT

Figures 4, 5:
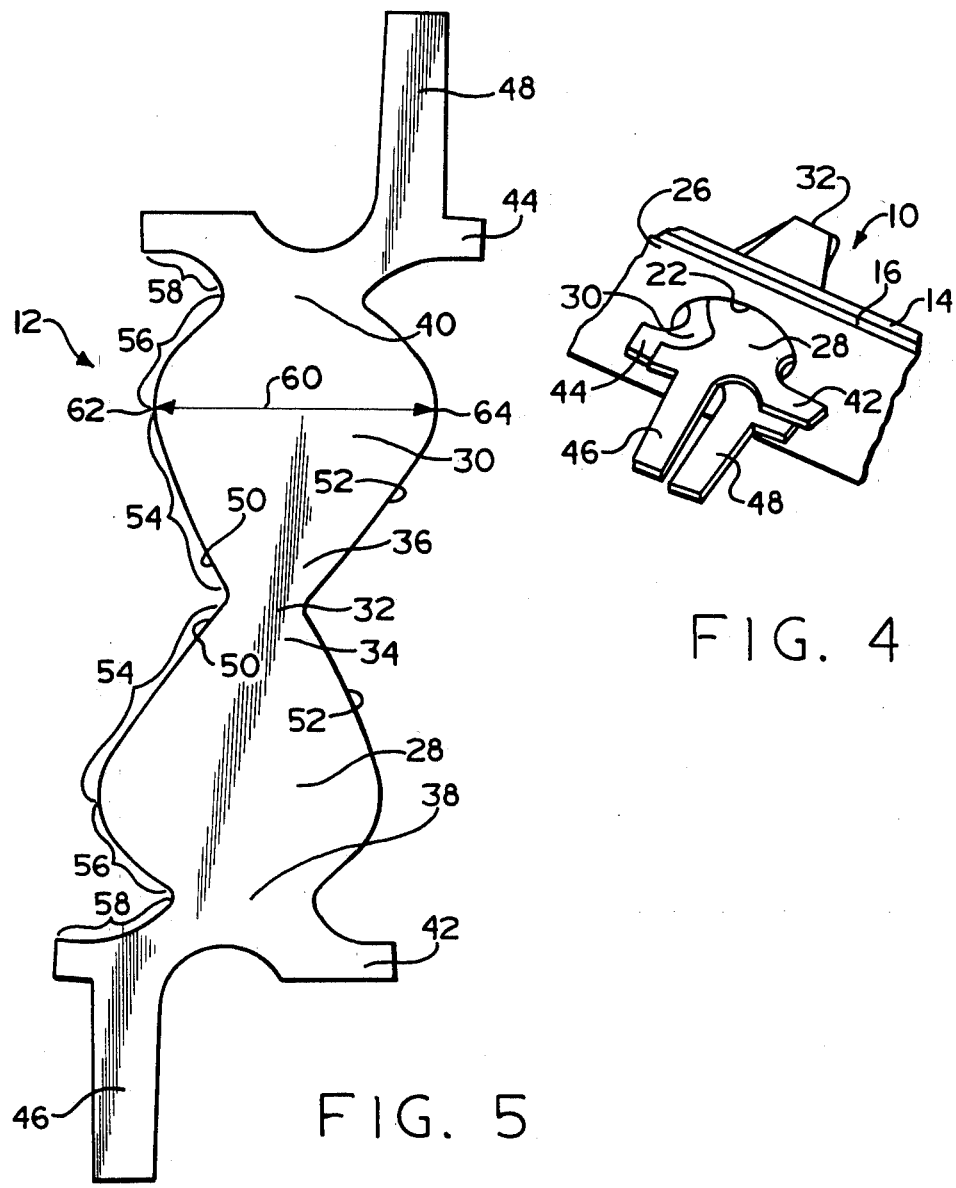
FIG. 4 is a perspective view of the fastener of FIG. 1.
FIG. 5 is a plan view of the stamping from which the fastener of the present invention is formed.

In this disclosure, certain terminology will be used for convenience in reference only and will not be limiting. For example, the term "axially" will refer to the direction parallel to the axis of the apertures in the panels in which the fastener of the present invention is to be received. The term "transverse" will refer to the direction substantially perpendicular to the axial direction. The terms "upward" and "downward" will refer to the directions toward and away from, respectively, the tip or nose portion of the fastener of the present invention. The terms "inwardly" and "outwardly" will refer to directions toward and away from, respectively, the geometric center of the device or portion thereof being described. All foregoing terms mentioned above include the normal derivatives and equivalents thereof.

The fastener 10 of the present invention may be seen by reference FIGS. 1–4 and the sheet metal blank 12 from which the fastener 10 is formed may be seen by reference to FIG. 5.

Referring to FIGS. 2 and 3, the fastener 10 may be seen in the initial nondeformed insertion configuration thereof. The fastener 10 is designed to join and securely hold together two or more panels, 14 and 16, having a combined axial thickness 18 within a given range (called the panel range of the fastener) and aligned apertures 20 and 22 of a given diameter 24 for receipt of the fastener 10. The fastener 10 allows joining of the panels 14 and 16 from one side 26 of one of the panels, panel 16, only. While the apertures 20 and 22 are preferably annular as illustrated, it is understood that the fastener 10 of the present invention may also be utilized with panels having apertures of other configurations.

The fastener is preferably a sheet metal stamping from a low temper, setable, nonspring steel or other suitable sheet metal.

The fastener 10, in the initial nondeformed configuration thereof, comprises two generally flat sidewall portions 28 and 30 folded back upon one another in close side-by-side relationship in a substantially aligned superimposed relationship to define a bight portion 32 therebetween. Each of the sidewall portions, 28 and 30, respectively, is of a generally dart shape and comprises a tip or nose section, 34 and 36, respectively, adjacent the bight portion 32, a panel engaging section, 38 and 40, respectively, a base portion 42 and 44, respectively, and a tab section 46 and 48, respectively, extending downwardly from the base portions. As may be seen, tab portions 46 and 48 extend downwardly from opposite transverse ends of base portions 42 and 44, respectfully.

Each of the sidewall portions 28 and 30 is defined by two transversely outward edges 50 and 52 which are preferably mirror images about an axially extending line transversely centered on the fastener 10. Each of the edges 50 and 52 include a first segment 54 extending downwardly and transversely outwardly from the nose section 34, a second segment 56 extending downwardly and transversely inwardly from the first segment and a third segment 58 extending downwardly and transversely outwardly from the second segment 56. In the nondeformed aligned initial position of fastener 10, the transverse distance 60 between the junctions 62 and 64 of edge segments 54 and 56 on edges 50 and 52 is equal to or slightly less than the diameter 24 of apertures 20 and 22 in panels 14 and 16, respectively. On both sidewall portions 28 and 30, at least the lower parts of the transversely outer extremities of edge segments 58 of edges 50 and 52 are transversely spaced apart by a distance greater than the diameter 24 of aligned apertures 20 and 22 whereby the base portions 42 and 44 will not pass through the apertures 20 and 22. As is known in dart fasteners, the axial separation between the junctions 62 and 64 from the point on edge segments 58 wherein edges 50 and 52 are transversely separated by a distance equal to the diameter 24 of apertures 20 and 22 defines the maximum combined thickness 18 of panels which may be joined by fastener 10.

Edge segments 54, 56 and 58, and the junctions thereof, may be smooth continuous surfaces as shown and/or may be defined by substantially straight surfaces meeting at relatively sharp corners.

Bight portion 32 is nonresiliently deformable, or malleable, allowing the tab portions 46 and 48 to be moved transversely relative to one another to cause the sidewall portions 28 and 30 to assume and remain in a non-aligned fastening position or configuration as shown in FIGS. 1 and 4. Movement of tab portions 46 and 48 transversely relative to one another from the nondeformed position shown in FIG. 2 will result in the misalignment of sidewall portions 28 and 30 whereby the transverse separation, in combined projection, of the transversely outwardmost of edges 50 of portions 28 or 30, will be more transversely spaced from the most transversely outward edge 52 of the other of the sidewall portions. It is preferred that the sidewall portions 28 and 30 be nonresiliently misaligned by forcing or squeezing tab portions 46 and 48 transversely inwardly toward one another, as seen in FIG. 1, and thus the specific shape of edge 50 of sidewall portion 28 and the specific shape of edge 52 of sidewall portion 30 is not critical. However, it is preferred the sidewall edges 50 and 52 of both sidewall portions 28 and 30 be identical allowing the sidewall portions to be nonresiliently misaligned by either inward or outward transverse movement of the tab portions 46 and 48 relative to each other.

The use of fastener 10 to join and firmly retain two panels, 14 and 16, having a combined thickness 18 within a given range, and aligned apertures 20 and 22 having a given diameter 24, is as follows. Panels 14 and 16 are positioned such that apertures 20 and 22 are generally in alignment. Fastener 10 is then inserted into the aligned apertures from one side of the panels, 26, nose end 34 first. The outwardly tapered nose end 34 enters the apertures easily and the opposed edge segments 54 will act to align and transversely center the fastener 10 in the apertures and will also act to align the apertures relative to one another. This alignment of the fastener relative to the apertures and the apertures relative to one another will continue as the junctions 62 and 64 of edge segments 54 and 56, which are of equal or less transverse separation 60 as diameter 24 of the apertures passes through the apertures. Further insertion of the fastener 10 into the apertures will bring a portion of edge segments 58 on the base 42 into contact with the side 26 of panel 16. The above is preferably accomplished by holding the fastener 10 by tabs 46 and 48 and inserting the fastener through the aligned apertures 20 and 22. By then moving the tabs 46 and 48 transversely together, preferably by use of a pliers or the like, bight portion 32 is nonresiliently deformed and the sidewall portions 28 and 30 are nonresiliently misaligned increasing the effective transverse separation between edge 52 of sidewall portion 28 and of edge 50 of sidewall portion 30 as may be seen by reference to FIG. 1 and FIG. 4. This nonresilient deformation continues until the edge segments 56 and 58 of edge 52 of sidewall portion 28 and edge 50 of sidewall portion 30 firmly engage the edges of apertures 20 and 22. Due to the inward and downward taper of edge segments 56 and the downward and outward extension of edge segments 58, the transverse separation of edge 52 of portion 28 and edge 50 of portion 30 will draw the panels 14 and 16 axially together to firmly retain same. As the tabs are moved transversely together the bight portion 32 will be nonresiliently deformed to take a set in the deformed or assembled configuration as seen in FIG. 1 and 4 thus retaining the two sidewall portions 28 and 30 in the desired nonaligned relative position.

It is understood, that various self-locking features can be utilized if desired in connection with the fastener 10. Such self-locking features may include interacting ratcheting members formed on sidewall portions 28 and 30.

It may thus be seen, that a relatively simple, inexpensive sheet metal fastener 10 is provided for quickly and easily joining two or more panels having a combined thickness within a give range and aligned apertures of a given diameter. The fastener 10 is of a relatively simple structure and produced from relatively inexpensive sheet metal material, requires only a minimal axially insertion force. Final assembly of fastener 10 to the panel assembly by nonresilient deformation of the fastener is accomplished by commonly available tools such as pliers or the like.

Although the preferred embodiment is shown and described with a certain degree of particularity, it is understood that the disclosure of the preferred embodiment is by way of example only and that various modifications and rearrangements of the structure are possible within the spirit and the scope of the invention as hereinafter claimed.

I claim:

1. A one-piece sheet metal dart type fastener for joining and retaining two or more panels having a combined axial thickness within a given range and aligned apertures of a given diameter, said fastener comprising:

first and second generally flat sidewall portions folded over upon themselves in close side-by-side relation and defining a bight portion therebetween, each of said sidewall portions comprising a nose section adjacent said bight portion, a panel engaging section extending downwardly from the nose section, a base section extending downwardly from the panel engaging section and a tab section extending downwardly from said base section, the two tab sections extending downwardly from opposite transverse ends of the base portions, the sidewalls of said engaging sections each defined by an edge on at least the transverse side thereof opposite the transverse base end from which the tab portion extends comprising a first segment extending transversely outwardly and downwardly from said nose section, a second segment extending transversely inwardly and downwardly from said second segment and a third segment extending transversely outwardly and downwardly from said second segment;

in the initial nondeformed configuration of said fastener, said sidewall portions aligned to define in projection a dart shape wherein the junctions of said first and second edge segments of said first and second sidewall portions are transversely separated by a distance equal to or less than the diameter of said apertures in said panels and at least the lower parts of said third edge segments on said first and second sidewall portions are transversely separated by a distance greater than the diameter of said apertures in said panels;

said tab portions adapted to be transversely moved relative to one another to nonresiliently deform said bight portion with said first and second sidewall portions defining in projection a configuration wherein axially aligned parts of the second edge segments of said first and second wall portions are transversely separated by a distance greater than the diameter of said apertures and said panel.

2. The fastener of claim 1 wherein each of said sidewall portions are provided with edges defining a mirror image on either side of an axially extending line transversely centered in each of said wall portions.

3. The fastener of claim 2 wherein said fastener is formed with a nonspring steel stamping.

4. The fastener of claim 2 wherein said sidewall portions, in the initial nondeformed configuration of said fastener, are aligned in projection.

* * * * *